Oct. 20, 1970

J. W. LOVELY 3,534,502

APPARATUS AND METHOD FOR GRINDING
AN EXTERNAL SURFACE OF REVOLUTION

Filed Jan. 24, 1968

INVENTOR
JOHN W. LOVELY
BY
James H. Bower
ATTORNEY

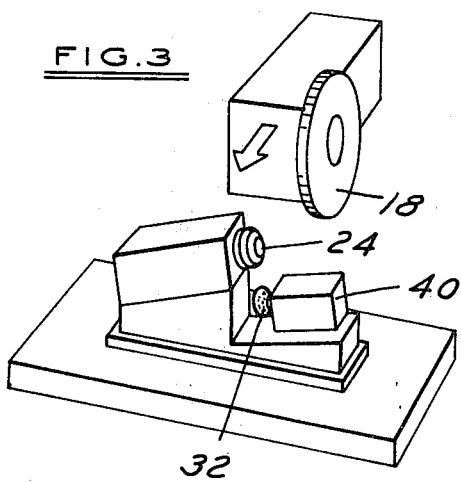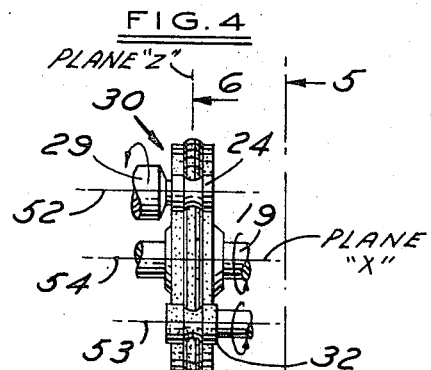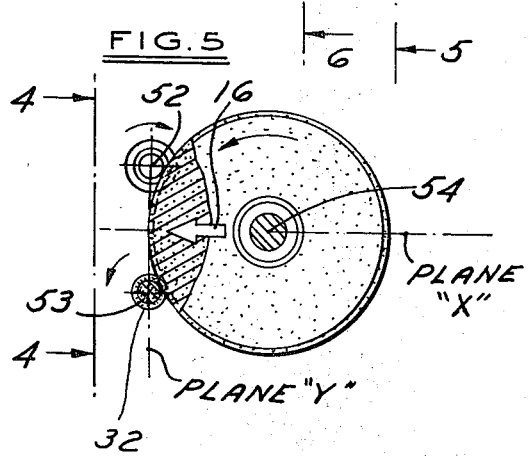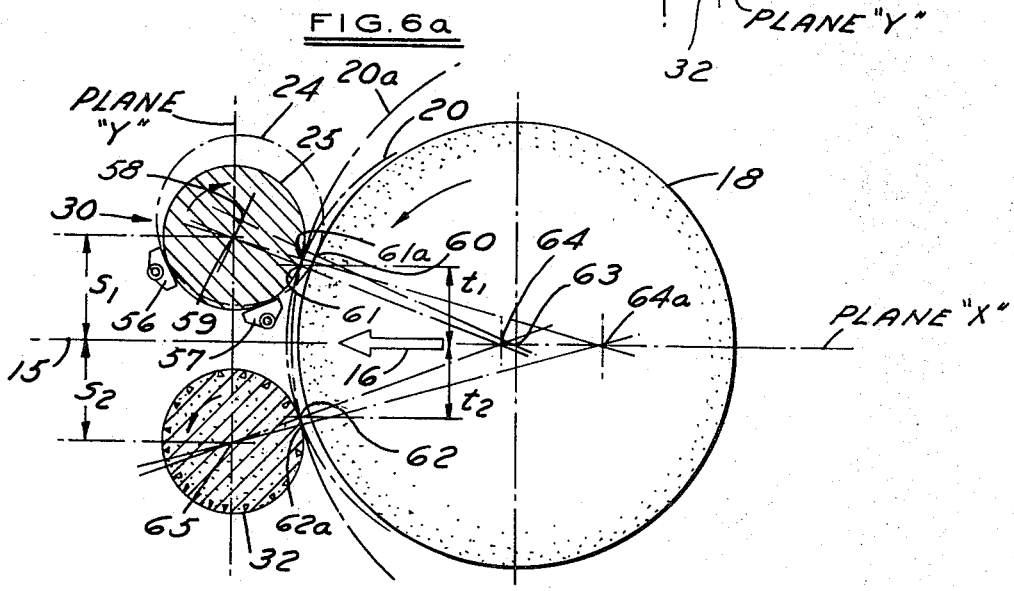

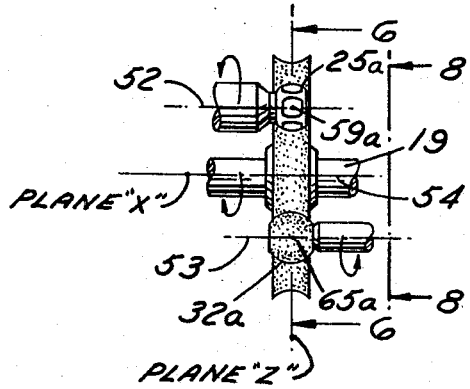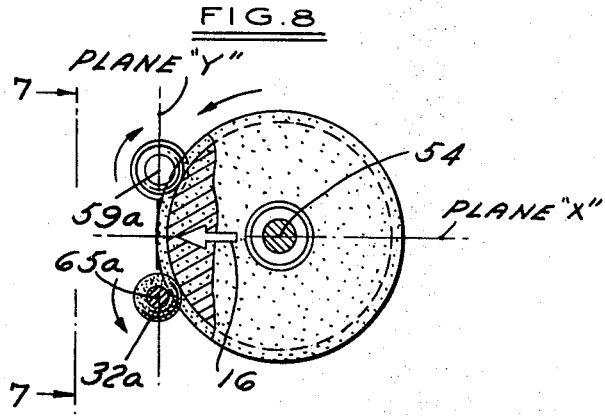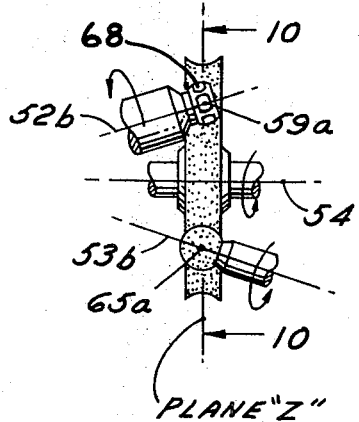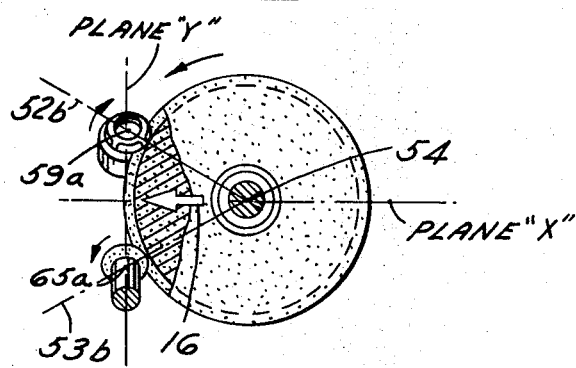

United States Patent Office 3,534,502
Patented Oct. 20, 1970

3,534,502
APPARATUS AND METHOD FOR GRINDING AN EXTERNAL SURFACE OF REVOLUTION
John W. Lovely, Springfield, Vt., assignor to Bryant Grinder Corporation, Springfield, Vt.
Filed Jan. 24, 1968, Ser. No. 700,232
Int. Cl. B24b 7/00, 9/00, 1/00
U.S. Cl. 51—5
8 Claims

ABSTRACT OF THE DISCLOSURE

An apparatus for grinding an external surface of revolution on a workpiece to accurate size and form without precision feed stops, controlled through simultaneous wheel dressing by means of a revolving dressing tool of essentially the same external shape as the desired workpiece. The two fixed axes of workpiece and dressing tool are located respectively above and below the feed line of the grinding wheel.

BACKGROUND OF THE INVENTION

In external form grinding of surfaces of revolution, the usual grinding machine incorporates some mechanism for truing or dressing a "negative" shape on the outside periphery of the abrasive grinding wheel. This mechanism can take several forms, such as a single point diamond or multipoint diamond nib following a template, or a single diamond point swinging around a pivot at a controlled radial distance.

Another type of dresser incorporates a roll, surfaced with diamond or similar abrasive, formed to the external shape of the desired workpiece.

These various dressing means are applied in several ways to a variety of grinding machines. The simplest application might be that to a cylindrical grinder as best adapted to tool room work. In this case, the dresser is located so as to contact the wheel at the point of grind. The dressing tool could thus be mounted on the tail stock, or on a mandrel between centers, for example, and translated across the wheel face. Such arrangements introduce the disadvantage of lost setup time, since the dressing tool must be removed prior to introducing the workpiece.

In an effort to reduce the lost time, most current external or form grinders locate the wheel dressing apparatus at a different point around the periphery of the wheel than at the grind point. This allows the work station to be fixed on the feed line in front of the wheel. The wheel dreser must, however, be compensated toward the wheel by a calculated amount each time the dress occurs. This necessitates a supplementary compensation slide for the wheel dresser, since the wheel dresser must move toward the wheel center, as the wheel center moves toward the grind point.

During the grind, the wheel is fed along the feed line into the work, reducing its size until the slide on which the feed takes place reaches a fixed feed stop or abutment. Usually the slide is held here momentarily until the deflection of the wheel spindle, induced by pressure between the wheel and workpiece, has been dissipated. This is called "spark out." Dirt or grinding swarf on the feed stop can cause oversize parts by halting the feed prematurely.

One grinder, for example, illustrated in patent U.S. No. 3,171,234 approaches a solution by dressing on a line offset below the feed line of the grinding wheel by a distance approximately the same as the contact or grind point distance above the line of feed.

However, there are certain disadvantages in this machine which are not found in my invention. One such disadvantage is the placement of the wheel dressing tool considerably nearer the grinding wheel than the workpiece position, which precludes a simultaneous dress and grind and requires a selective feed mechanism.

Another disadvantage is the single point diamond which requires translation across the face of the wheel during dress, thus consuming a considerable amount of time during the dress portion of the cycle.

This machine equates the distance from the point of dressing tool to wheel engagement below the wheel axis, to the distance above the wheel axis at which the workpiece axis is located. The patent correctly notes that this distance is only substantially the same. Change of wheel size varies the equality and affects sizing. Either operator adjustment, or the addition of an automatic post-gaging and machine size correction unit is necessary to offset this variation.

All of the above described machine arrangements embrace some or all of the following disadvantages:
(1) Loss of productivity due to time-out for dress.
(2) Dressing means which requires a separate and movable structure, dependent on operator handling and care for maintenance and accuracy.
(3) Use of auxiliary slides that introduce errors of position repeat accuracy, in combination with their supplementary driving means, synchronized to grinding infeed, and necessitating compromise with rigidity, wear, and reliability.
(4) Feed stops for grind and dress.
(5) Increased machine control complexity.
(6) Gaging apparatus to end grinding and correct for wheel size variation.

SUMMARY OF THE INVENTION

It is therefore one object of the invention to provide a simplified form grinding machine which will be more rigid, accomplished by elimination of supplementary slides used during the grinding cycle and their necessary precision feed stops.

Another object is the elimination of repeat errors introduced by the movable relationship between wheel dresser and workpiece during the cycle.

A further object is to increase production by elimination of the dress cycle time, accomplished by simultaneous dress and sparkout during the final portions of the grind cycle.

It is also my object to provide such a grinder in which wheel wear will have little or no effect on size of the finished workpiece; contact with the wheel dresser will determine finished size, and no post-gaging will be necessary.

BRIEF DESCRIPTION OF THE DRAWINGS

FIG. 3 is a pictorial view of the grinding wheel feeding into the workpiece and dressing cutter;

FIG. 4 is a partial side view looking toward the grinding edge of the grinding wheel;

FIG. 5 is a partial front view of the grinding wheel dressing cutter, and workpiece, as shown in FIG. 4

FIG. 6a is the same as FIG. 6 except illustrating the embodiment where the finished workpiece size is the same as the dressing tool size;

FIG. 7 is the same as FIG. 4 showing a spherical workpiece and dressing tool;

FIG. 8 is the partial front view of FIG. 7;

FIG. 9 is the same as FIG. 7 but showing the axes of the workpiece and the dressing tool tilted;

FIG. 10 is the partial front view of FIG. 9; and

DESCRIPTION OF THE PREFERRED EMBODIMENT

Figure 1:
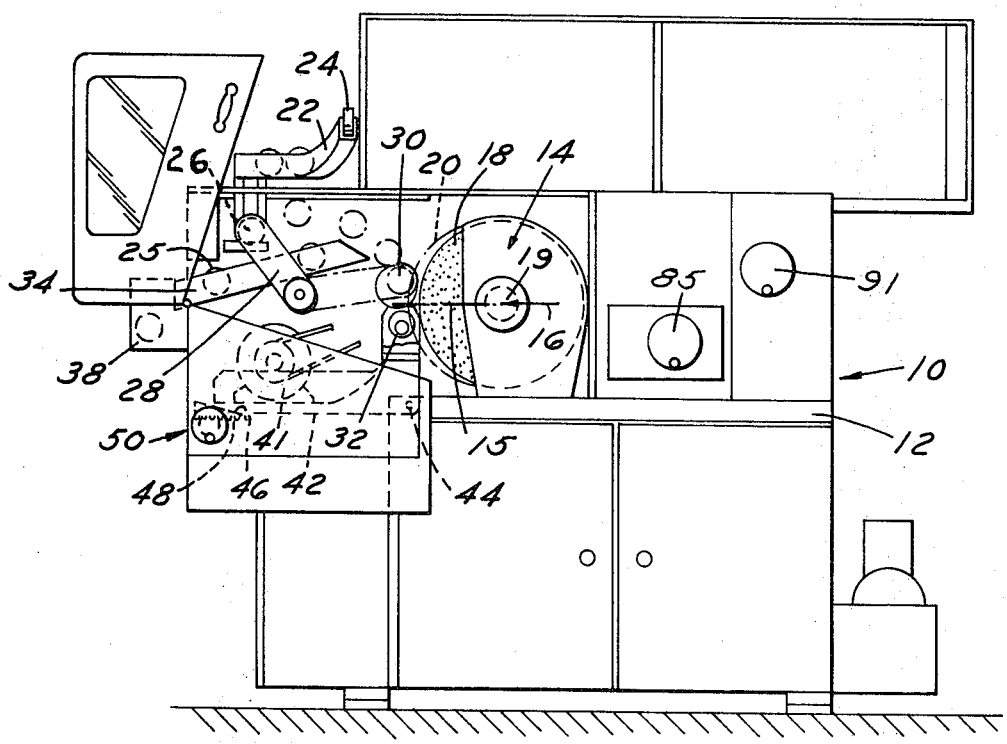
FIG. 1 is the front view of a form grinder with the guard shown raised to allow a clear view of the loading and grinding area with the workpiece and dressing cutter in operating position.

Referring first to FIG. 1, we see an external grinding machine or grinder 10. Mounted on a bed 12, suitably guarded, is a grinding wheel assembly 14, arranged for slidable movement in the feed direction as shown by arrow 16. The grinding wheel 18, mounted on the wheel spindle 19, is shown in the backed off or load-unload position. The finished size position 20 is shown in phantom.

Figure 2:
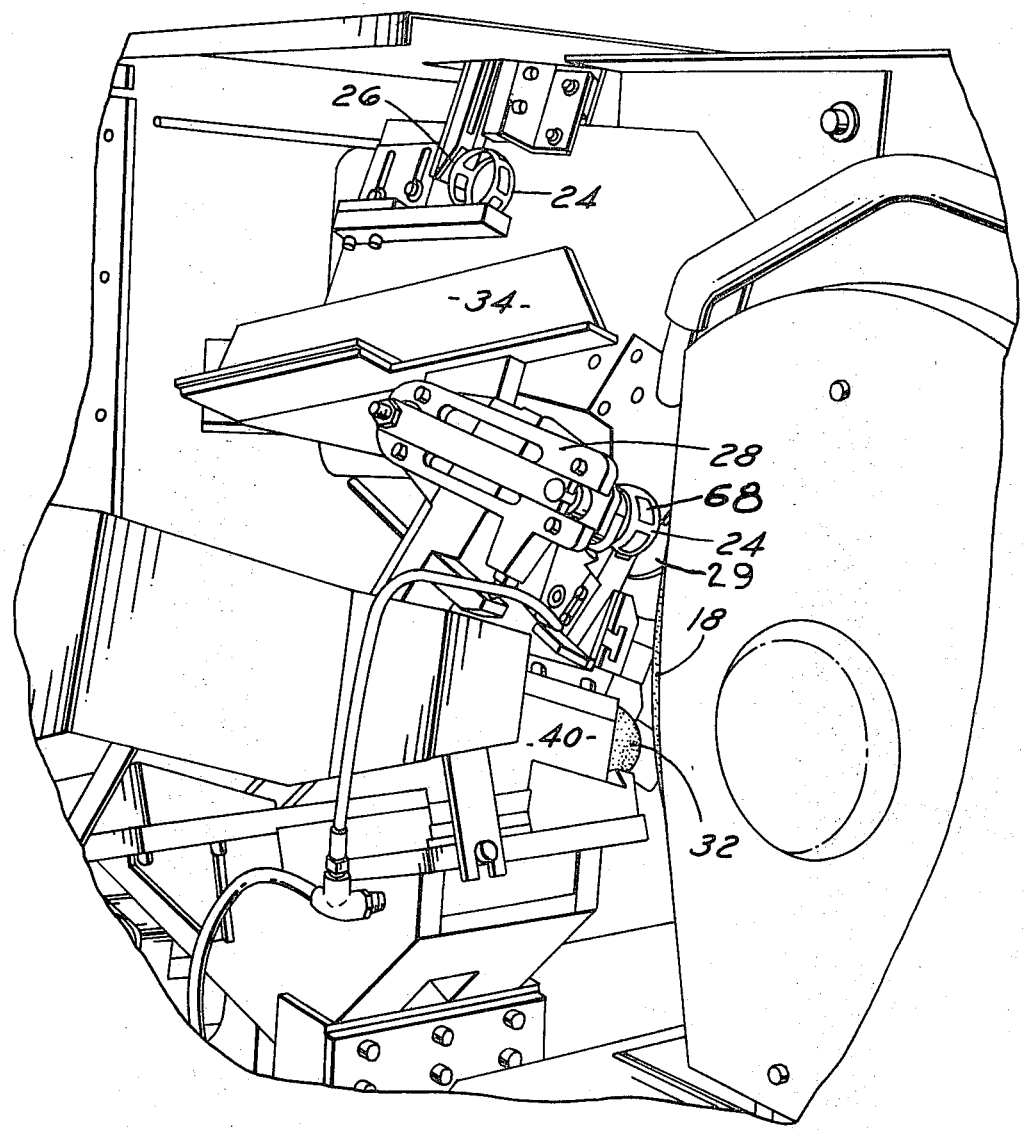
FIG. 2 is a perspective view showing the grinding wheel before it approaches the workpiece and the dressing cutter.

At the left end of the machine, located on top of the guard, is an inclined loading chute 22. Rough workpieces 24, which have already been face ground, are loaded by hand, and roll down the chute 22 to a rest position 26. From rest position 26, workpiece 24 is picked up by loader arm 28, and carried arcuately over to the work station 30, as shown in FIG. 2, where it is gripped by the conventional type of magnetic chuck 29.

Figure 6:
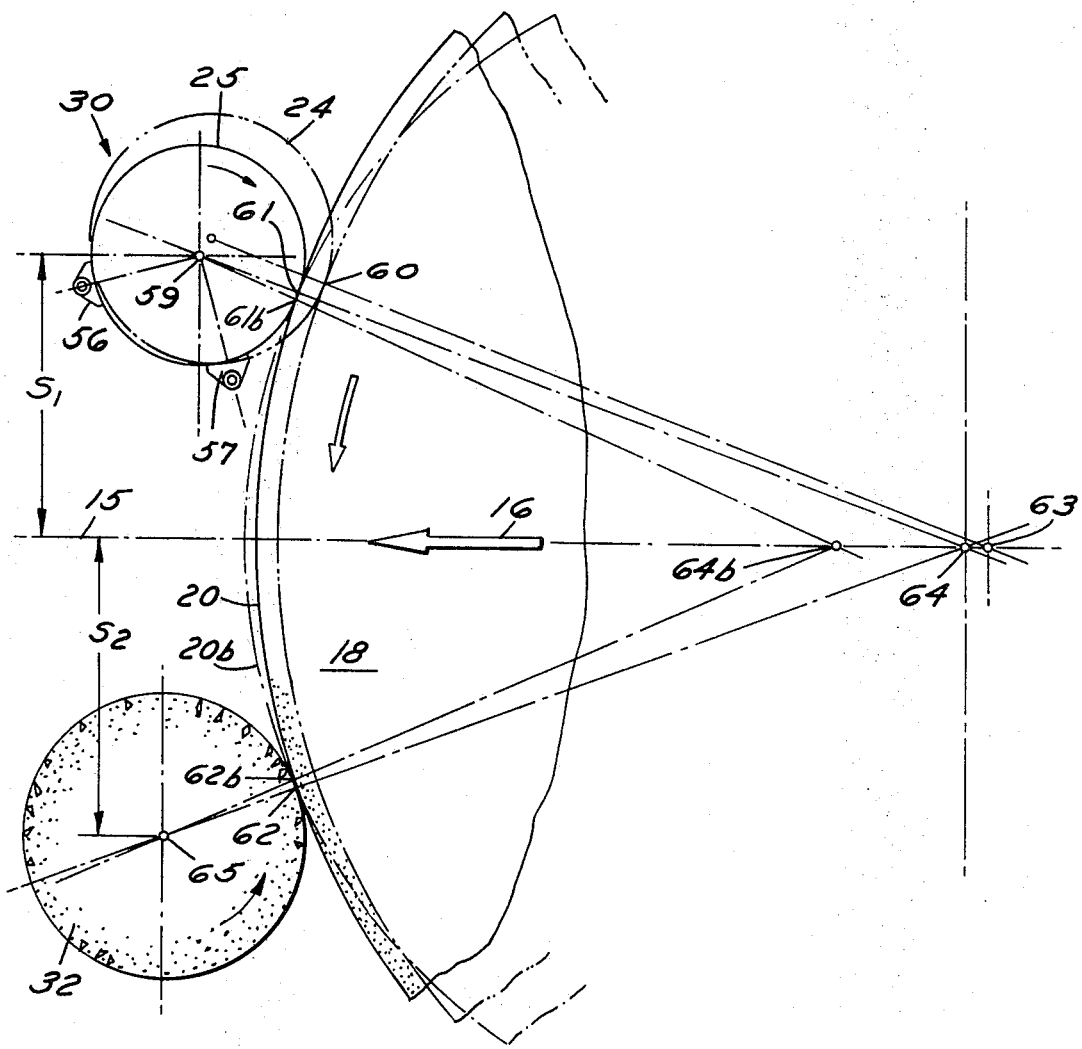
FIG. 6 is a schematic section through the wheel workpiece and dressing tool taken on plane Z.

The grinding wheel 18 is then advanced into the work along the feed line 15, shown by arrow 16, contacting the rough workpiece 24 at work station 30, and reducing its size until the wheel 18 reaches peripheral position 20. The theory of this operation is shown in FIG. 6, which will be discussed later on.

After the wheel contacts the dressing tool 32, which is coated with a hard abrasive such as diamond grit, the feed continues at the former rate for a fraction of a second to true or dress the wheel 18. Simultaneously, the workpiece 24 at work station 30 is "sparking out" since the grinding surface of the wheel 18 is unable to approach any closer to the workpiece 24 because of attrition by the dressing tool 32. The workpiece 24 is now finished size, and will be identified as 25.

The grinding wheel is then withdrawn to its clearance position back along the feed line 15, and the loader arm 28 removes the finished workpiece 25 upward from work station 30 and drops it into discharge chute 34. The finished workpiece 25 then rolls down the chute 34 to a suitable finished workpiece collector 38.

The size of the finished workpiece 25 is consistently maintained (a repetitive diametral tolerance of .0001″ is not unreasonable), however, a manual adjustment size correction is provided. This is illustrated as follows:

The dressing tool 32 is mounted on a dresser spindle unit 40, shown in FIG. 2 and FIG. 3, and pivots at shaft 44 shown in FIG. 1. It is belt-driven by motor 41, for which it serves as a mount.

In order to adjust the size of finished workpiece 25, as produced by the grinder, a tapered rack 48 as shown in FIG. 1 is moved in or out by means of a calibrated dial, shaft, and pinion assembly 50. Moving the tapered rack 48 in toward the base 42, causes the camming surface 46 of the base 42 (resting on the tapered rack) to rise, pivoting the base 42 clockwise about pivot shaft 44. This moves dressing tool 32 closer to the grinding wheel 18, which increases the size of subsequent finished workpieces 25.

FIG. 4 shows an end view looking along the line of feed with a rough workpiece 24 at the work station 30, gripped by the magnetic chuck 29. Also shown is the dressing tool 32 in dressing position. In this view, the two axes of revolution—workpiece axis 52 and dressing tool axis 53—are clearly shown as parallel to plane X containing the wheel axis 54 and feed directional arrow 16. Also, axes 52 and 53 are both parallel to wheel axis 54, as seen in FIG. 5.

FIG. 6 shows a cross section through the wheel 18, workpiece 24 and dressing tool 32, taken on plane Z (seen in FIG. 4).

Workpiece 24 has been loaded, and is at the work station 30. Wheel 18, workpiece 24, and dressing tool 32 are all rotating. Workpiece 24 rotates in a clockwise direction and is slidably supported on self-aligning shoes 56 and 57, in a manner well known to the art.

Wheel 18 is now fed along feed line 15, as shown by arrow 16. It first contacts the rough workpiece 24, which is oversize, at point 60, as shown in FIGS. 6 and 6a. The wheel center of revolution is at 63. Grinding takes place as the contact point moves from 60 toward 61, and the wheel center moves from 63 toward 64, until wheel face has reached peripheral position 20.

As the wheel to workpiece contact point 61 is reached, the first contact with the dressing cutter 32 is made at point 62. This determines the final size of the finished workpiece 25, because any further infeed will only reduce the wheel size, thus preventing a closer approach to the workpiece by the grinding surface.

As seen in FIG. 6 with a worn grinding wheel, wheel center 64 would be at 64b and the wheel peripheral portion 20 would be 20b, as in a smaller wheel, the contact points 61 would be 61b and 62 would be 62b, making identical the sizes of the respective workpieces ground with wheels centered at 64 and 64b, through proper choice of distances S1 and S2. With the axis of the grinding wheel variable between 64 and 64b, substantially identical workpieces are produced with minor errors involved. For example, using a 2,750 inch diameter dressing cutter 32 with either a 20 inch diameter new grinding wheel at peripheral position 20, or a 16 inch diameter worn grinding wheel at peripheral position 20b, a minimum workpiece diameter of 1.9993 inch, at approximately 18 inch wheel diameter will be produced. Stated in other words, using a 2.75 inch diameter dressing cutter to dress a grinding wheel for grinding a 2.000±.00035 inch workpiece, a 20 inch diameter grinding wheel can be used until worn down to 16 inches in diameter without major error in dimension.

Referring now to FIG. 6a, we see the case where workpiece 25 and dressing tool 32 are identical in diameter. Here, it is evident by symmetry, that if the fixed center of revolution 65 of the dressing tool 32, and the movable center 59 of workpiece 25, are placed equidistant from feed line 15 (i.e. $S_1 = S_2$), and if centers 65 and 59 are both in planes Y and Z, (both planes normal to plane X containing feed line 15), and further since radius 61–64 is identical to radius 62–64, therefore, radius 61–59 equals radius 62–65, and the diameter of 25 precisely equals the diameter of 32. 64a is shown in FIG. 6a to indicate the center of a larger wheel 20a which contacts the finished workpiece 25 at 61a and is dressed by cutter 32 and 62a.

Grinding a sphere is a further modification of the invention. This is shown in FIG. 7 and FIG. 8, whose similarity to FIG. 4 and FIG. 5 is evident. In this instance, the centers of sphericity of the finished workpiece 25a, and dressing tool 32a, designated as 59a and 65a respectively, are precisely located in planes Y and Z, and equidistant from plane X. This insures that they are radially equidistant from the grinding wheel axis 54 but this is not always necessary as previously described and shown in FIG. 6.

Due to the forces between the grinding wheel and workpiece, it is desirable to keep the change in area of contact between the grinding wheel and the workpiece as gradual as possible in order to maintain constant unit pressure throughout the grinding cycle. It is, therefore, necessary to tilt the axes of the workpiece and dressing cutter, respectively as shown in FIGS. 9 and 10, when grinding a workpiece containing openings, such as a ball cage from a constant velocity ball joint. This results in improved geometry as well as a better surface finish due to the gradual change in contact area as the grinding wheel crosses the openings 68. As noted above, the centers of sphericity 59a and 65a must be precisely located, however, the axes do not need to be parallel or at any special angle to accomplish this.

A further desirable advantage gained from the tilted axis is the component of the downward force imparted to the workpiece by the grinding wheel which thrusts the workpiece in tighter contact with the driver.

To accentuate the similarity of FIG. 7 and FIG. 8 with FIG. 9 and FIG. 10, the elements employed are the same, therefore, the modified embodiment has been marked with the same reference numerals used for the corresponding elements in the embodiment shown in FIG. 7 and FIG. 8; however, the axes 52b and 53b, shown in FIG. 9 and FIG. 10, are transverse. The four figures, (FIGS. 7–10 inclusive) are subject to the same proof shown in FIG. 6a by substitution of 59a for 59, 65a for 65, 32a for 32 and 25a for 25. These four figures need not be limited to spherical workpieces. This is obvious in the case of FIGS. 7 and 8, which already have non-spherical counterparts in FIGS. 4 and 5. It is less obvious that FIGS. 9 and 10 apply to non-spherical surfaces, but it can be shown that this is valid provided undercutting is avoided. For example, all but the very ends of an ellipsoidal workpiece can be ground with the axes tilted substantially, but the end faces of a cylinder cannot be ground with any tilting of the axes. Perfect symmetry of size, location, and orientation will result in perfect repetition of workpiece size and shape over a reasonable range of wheel size. Some deviations from symmetry may be permitted by specific workpiece tolerances and wheel size ranges.

OPERATION

The important aspects of this invention are that the grinding of the workpiece is above the line of feed travel, and the form dressing of the grinding wheel with a diamond roll cutter substantially the same or equidistant below the line of feed travel. This arrangement produces an extremely simple machine, since the only moving part is the wheelslide, everything else being bolted or fastened firmly to the bed of the machine. It results in an extremely accurate machine without any need for in-process gaging, because the diamond roll cutter is positioned so that the wheel contacts it when the finish size is reached. In this way, it is difficult to grind a part that is not within tolerance.

Figure 11:
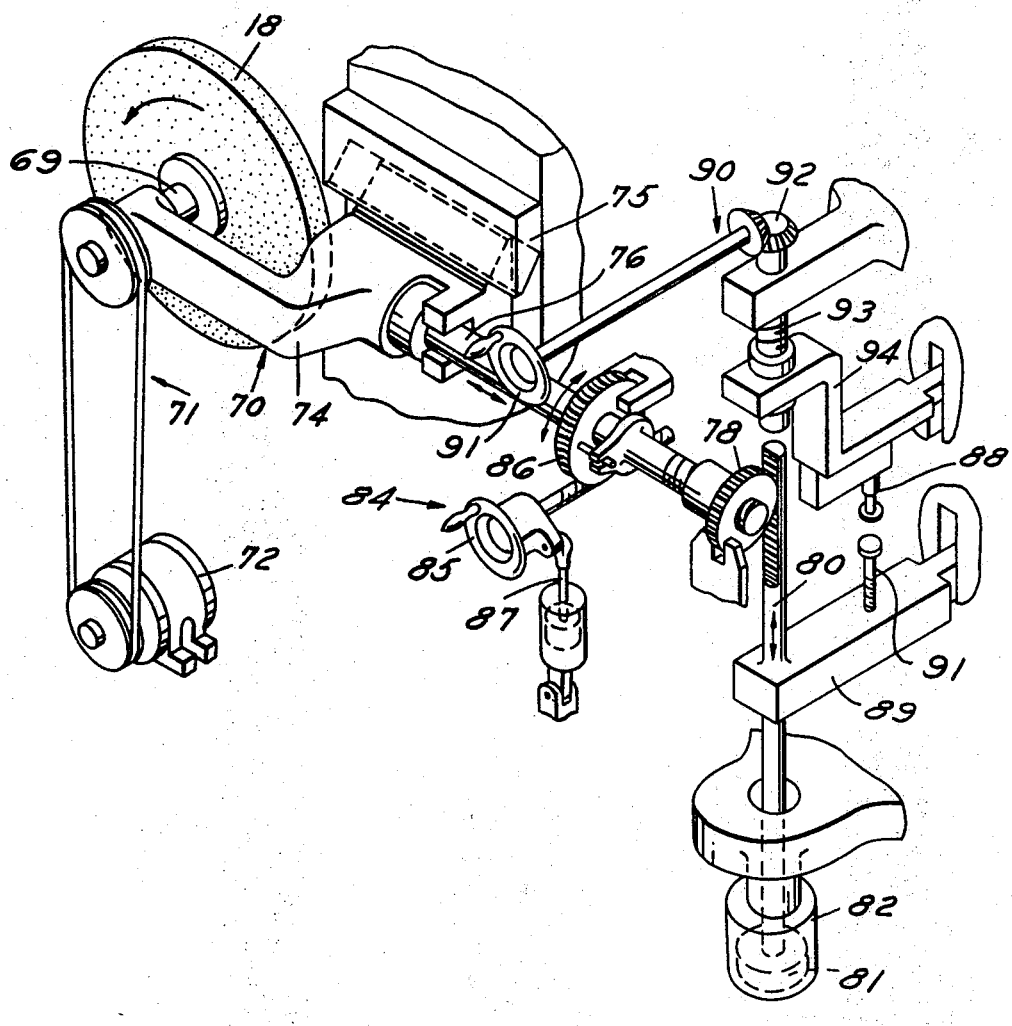
FIG. 11 shows the grinding wheel feeding mechanism.

The wheelslide 70 is movable to and from the grinding position by the mechanism shown in FIG. 11. The grinding wheel 18 is shown to be rotatable by means well known in the art; namely, belt and pulley means 71 driven by a motor 72. The shaft 69 mounting the grinding wheel 18 and the pulley is rotatably mounted on a wheelslide member 74. Wheelslide member 74 is slidably retained by dovetail member 75 attached to the machine bed. Feed screw 76 is connected to the wheelslide dovetail member 75 in a well known manner, obvious to one skilled in the art. The feed screw 76 is not unlike the feed screw mechanism described in copending application S.N. 590,591, filed Oct. 31, 1966, now Pat. No. 3,451,176, and assigned to the present assignee. The rotational movement of gear 78 threaded on feed screw 76 linearly feeds the grinding wheel 18 into the workpiece at a rate controlled by movement of feed rack 80, which is controlled by movement of feed piston 81 in feed cylinder 82.

To manually control the movement of feed screw 76 hand feed compensator 84 includes hand wheel 85 and a gear 86 slidably mounted on the feed screw 76. A sprag clutch and cylinder mechanism 87, or other means well known in the art, provides for movement of the gear 86 in one direction only which results in dress compensation of the wheel.

The extent of movement of the feed rack 80, and consequently the linear movement limit of wheelslide 70, is determined by the limit switch 88 and adjustable screw 91; so that as the feed rack 80 moves up, for example, the switch actuator block 89 moves along with it, until adjustable screw 91 reaches the limit switch 88. This controls the farthest advance of the wheelslide and thus the farthest advance of the grinding wheel 18 into the workpiece and dressing cutter. The adjustment of the limit switch 88 is controlled by stop mechanism 90 which includes a handwheel 91, mitre gears 92, stop adjusting screw 93, and movable switch block 94.

It will be recognized that while these particular embodiments are illustrative of the mechanism, various changes and modifications may be effected without departing from the spirit of the invention as defined by the claims which follow:

What I claim is:

1. A grinding machine for finish grinding a revolving workpiece to a precise diameter comprising:
   a rotatable dressing cutter of size and shape similar to a workpiece;
   a rotatable work holding means;
   a grinding wheel assembly containing a rotatable grinding wheel slideably mounted on a bed for feed along a feed line, said feed line passing between two axes of revolution located on opposite sides of said feed line;
   one of said axes being the axis of workpiece revolution;
   the other of said axes being the axis of revolution of said dressing cutter symmetrically located the same precise distance on the opposite side of said feed line as in the axis of revolution of said workpiece, the external size and shape of the dressing tool being a duplicate of the external size and shape desired in the finished workpiece.

2. The grinding machine as defined in claim 1, further including adjustment means adapted to move the axis of dressing tool revolution closer to, or further from, the grinding wheel axis relative to the axis of finished workpiece revolution, whereby minor size adjustment is provided.

3. A grinding machine to form grind the contours of a surface of revolution, comprising:
   a rotatable chuck means having an axis of workpiece revolution;
   a dressing tool rotatable on an axis of dressing tool revolution;
   both axes located in a vertical plane which is normal to a horizontal plane containing a feed line normal to said vertical plane, said feed line passing midway between said axes of revolution of said workpiece and said dressing tool;
   said dressing tool having the same outer shape as desired on said workpiece;
   a grinding wheel rotatable on a grinding wheel axis in said horizontal plane;
   said grinding wheel to feed along said feed line to plunge grind said workpiece, reducing its size until said dressing tool is also contacted, and simultaneously continuing in contact with both workpiece and dressing tool until withdrawn.

4. A grinding machine as defined in claim 3 in which said horizontal and said vertical planes are tilted while retaining their mutual angular relationship to each other.

5. A precision grinding machine as defined in claim 1, in which the axis of the work holding means is tilted relative to a plane containing said grinding wheel axis and said feed line.

6. A method of precision plunger grinding a surface of revolution on a workpiece including the steps of providing a rotating workpiece on one axis and a rotating dresing cutter on the other axis, the two axes disposed on opposite sides of a feed line delineating the infeed path of a rotating grinding wheel aligned so as to contact the rotating workpiece, moving said grinding wheel reducing the size of said workpiece until said grinding wheel contacts said dressing tool rotating on the other of said axes said dressing tool being of the precise outer shape desired on the finished workpiece, and continuing the infeed movement of said grinding wheel momentarily to dress said grinding wheel.

7. A machine for grinding external surfaces of revolution, comprising: a bed, a grinding wheel assembly incorporating a grinding wheel rotatable on a horizontal axis and slidably mounted on said bed for feeding movement along a horizontal feed line normal to said axis, a rotatable wheel dressing tool of the same external shape and dimensions as a desired surface of revolution on a finished workpiece, said wheel dressing tool located on a second axis a predetermined fixed distance below said feed line for dressing the grinding surface of said wheel, a third axis mounting a rough workpiece slightly larger in size than said finished workpiece and located the same predetermined distance above said feed line and vertically in line with said wheel dressing tool, said feeding movement of said grinding wheel contacting said rough workpiece and reducing the size of said rough workpiece, until at the exact moment of reaching finished size, said grinding surface of said wheel simultaneously contacting said rotatable wheel dressing tool for dressing said grinder wheel.

8. A grinding machine to form grind the contours of a surface of revolution, comprising:
   a rotatable chuck means having an axis of workpiece revolution;
   a dressing tool rotatable on an axis of dressing tool revolution;
   both axes located in a vertical plane which is normal to a horizontal plane containing a feed line normal to said vertical plane;
   said workpiece and said dressing tool are spherical with duplicate outer diameters and with their centers of sphericity located on a vertical line intersected at its midpoint by said feed line;
   a grinding wheel rotatable on a grinding wheel axis in said horizontal plane;
   said grinding wheel to feed along said feed line to plunge grind said workpiece, reducing its size until said dressing tool is also contacted, and simultaneously continuing in contact with both workpiece and dressing tool until withdrawn.

References Cited

UNITED STATES PATENTS

| 3,157,008 | 11/1964 | Beck | 125—11 X |
| 1,753,448 | 4/1930 | Smith | 125—11.2 |
| 2,674,831 | 4/1954 | Silven et al. | 51—5 |

FOREIGN PATENTS

| 553,393 | 6/1932 | Germany. |
| 333,560 | 3/1921 | Germany. |

JAMES L. JONES, Jr., Primary Examiner

U.S. Cl. X.R.

51—105, 290; 125—11